United States Patent [19]

Seki

[11] Patent Number: 5,115,494
[45] Date of Patent: May 19, 1992

[54] METHOD OF DRAWING A CUBIC VIEW

[75] Inventor: Nobuhiro Seki, Amagasaki, Japan

[73] Assignee: International Technical Illustration Co., Inc., Osaka, Japan

[21] Appl. No.: 469,763

[22] Filed: Jan. 26, 1990

Related U.S. Application Data

[63] Continuation-in-part of Ser. No. 53,128, May 22, 1987, abandoned.

[30] Foreign Application Priority Data

May 28, 1986 [JP] Japan ............................ 61-123066
Jan. 30, 1987 [JP] Japan ............................ 62-21162

[51] Int. Cl.⁵ ........................................... G06F 15/72
[52] U.S. Cl. .................................... 395/127; 395/142; 395/143; 395/141
[58] Field of Search ... 364/521, 522, 512, 900 MS File

[56] References Cited

U.S. PATENT DOCUMENTS

| | | | |
|---|---|---|---|
| 3,636,328 | 1/1972 | Korelitz et al. | 364/512 |
| 4,181,954 | 1/1980 | Rosenthal et al. | 364/512 X |
| 4,667,236 | 5/1987 | Dresdner | 364/522 X |
| 4,734,690 | 3/1988 | Waller | 364/522 X |

*Primary Examiner*—Gary V. Harkcom
*Assistant Examiner*—Mark K. Zimmerman
*Attorney, Agent, or Firm*—Lowe, Price, LeBlanc & Becker

[57] ABSTRACT

Standard patterns are formed from specific shapes making different inclination angles with a plane of projection, projected onto that plane of projection and then stored in a memory of a known CAD system. Subsequently, at least one standard pattern is called and displayed at an arbitrary position on a screen of a displaying apparatus. Then, a required standard pattern among the standard patterns called on the above-mentioned screen of CAD system is manipulated and copied at a predetermined position. The standard pattern is magnified or reduced by multiplying the copied standard pattern by the ratio of a required dimension to be displayed to a standard dimension. A predetermined shape is drawn as a cubic view by repeating this work. The above-mentioned standard patterns include principally straight lines and ellipses. The straight line has a multiplication ratio corresponding to the inclination angle made by the standard shapes to the standard dimension.

6 Claims, 14 Drawing Sheets

Fig. 1(a)
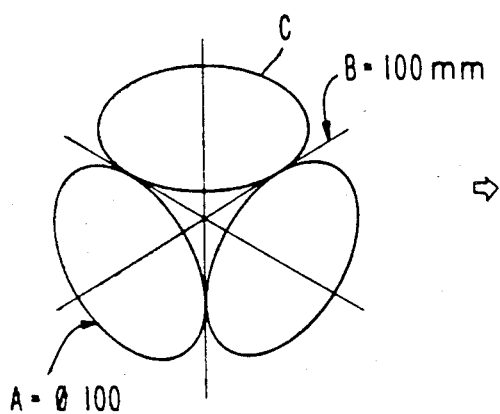
Fig. 1(b)
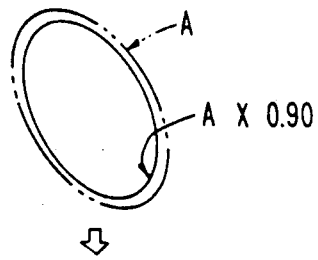
Fig. 1(c)
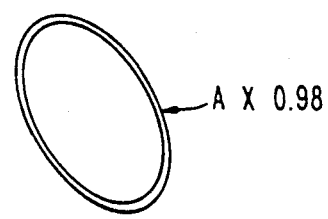
Fig. 1(d)
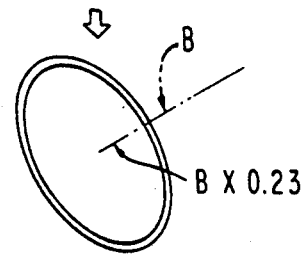
Fig. 1(e)
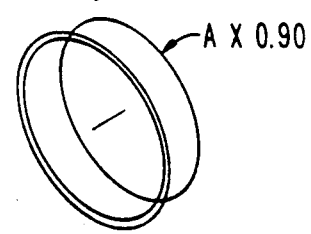
Fig. 1(f)
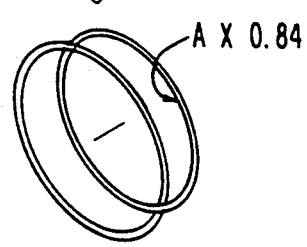
Fig. 1(h)
Fig. 1(g)
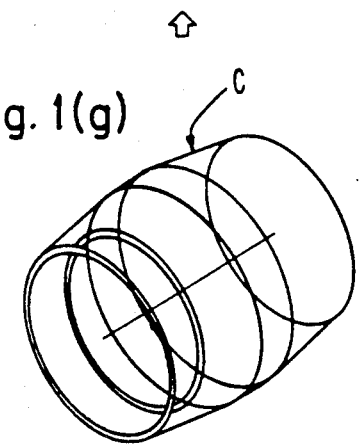
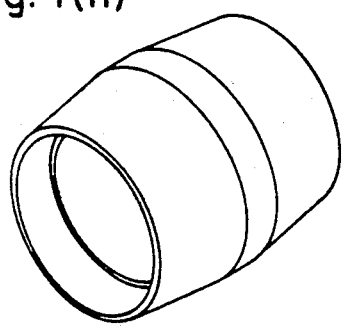

Fig. 5(a)
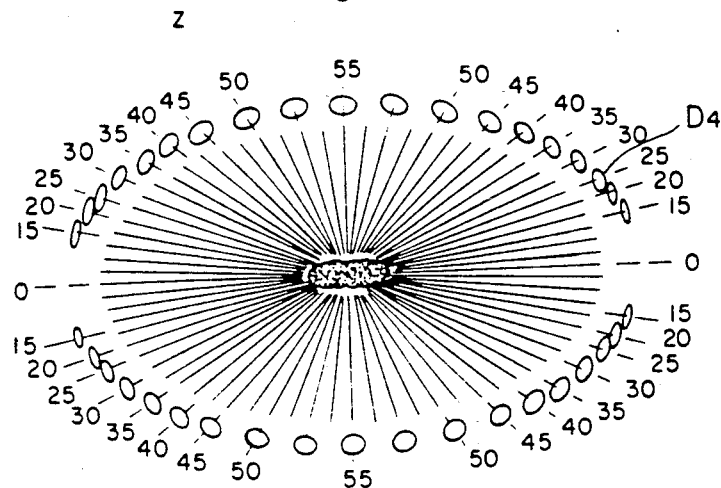
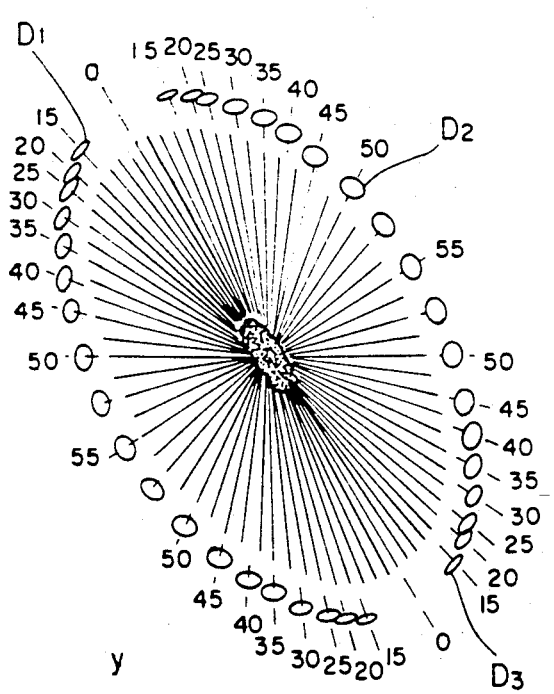
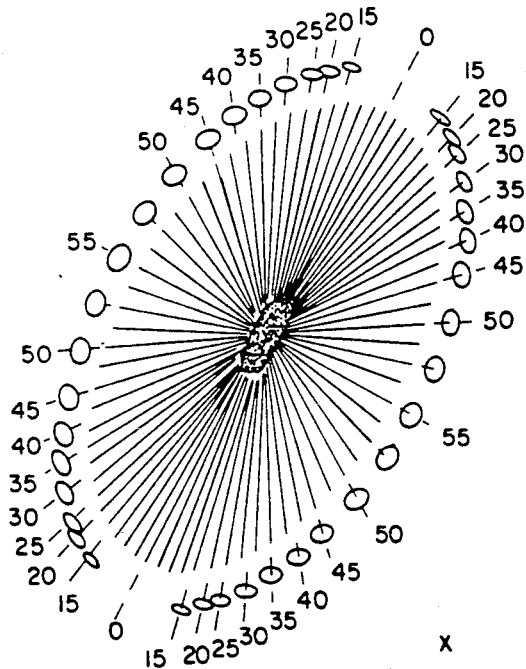
Fig. 5(b)　　　　　　　　Fig. 5(c)

⇩

⇩

⇩

⇩

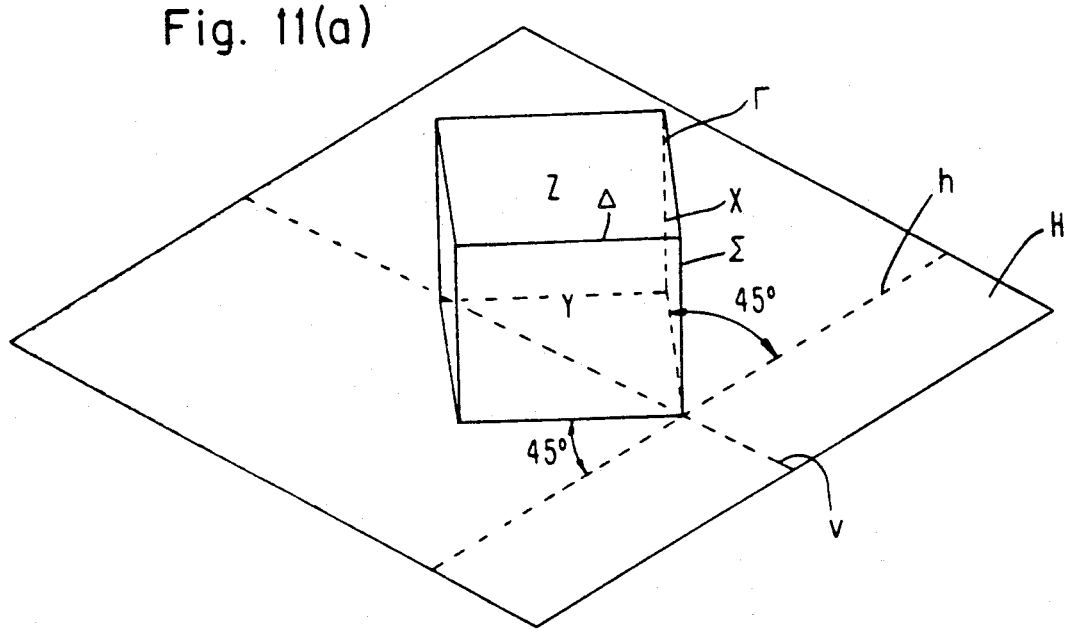
Fig. 11(a)
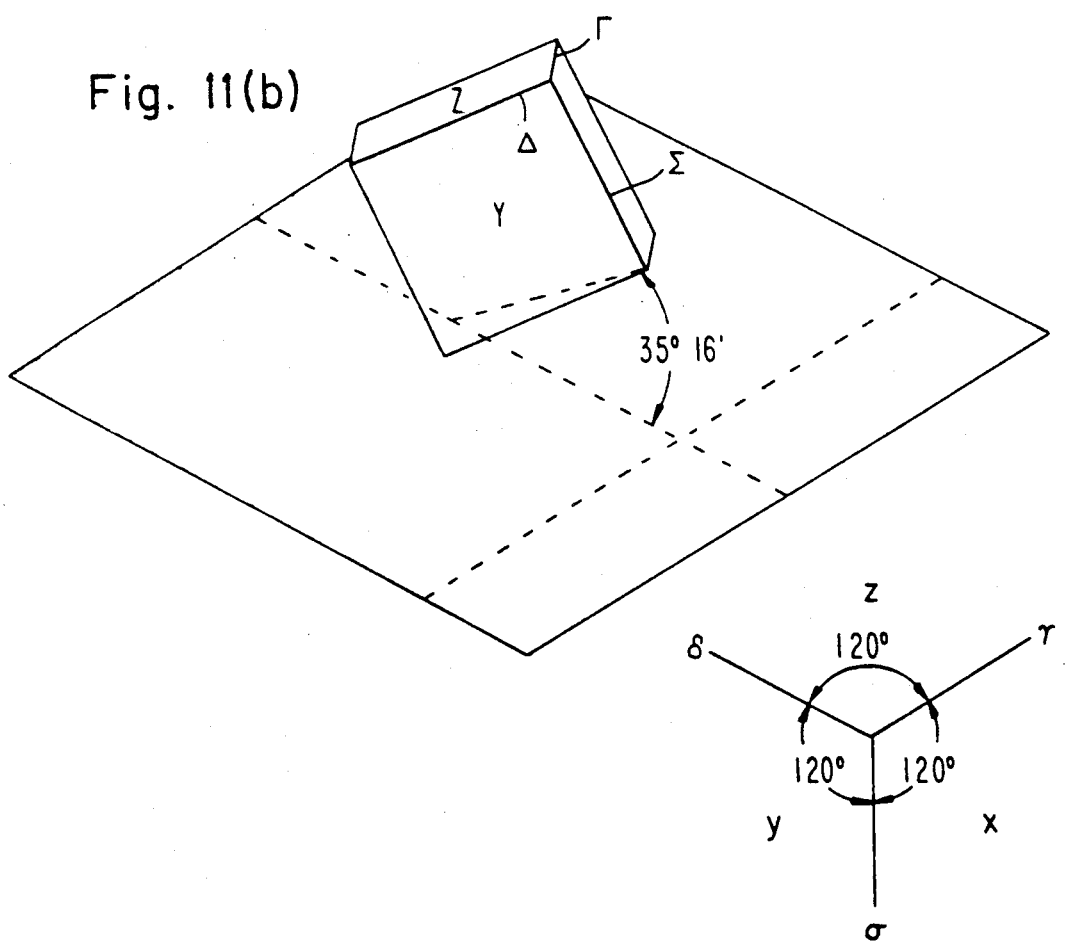
Fig. 11(b)
Fig. 11(c)

METHOD OF DRAWING A CUBIC VIEW

This application is a continuation-in-part of U.S. Ser. No. 07/053,128, filed on May 22, 1987, now abandoned.

FIELD OF THE INVENTION

The present invention relates to a method of drawing a cubic view, and specifically to a method of drawing a cubic view using a computer.

BACKGROUND OF THE INVENTION

When drawing a cubic view by handwork, the cubic view is drawn using a straight-line rule and an elliptic rule, utilizing a plan view and both side views drawn for working drawings, and therefore this work is very troublesome and takes much time. Also, a method of drawing a cubic view utilizing a computer has already been developed, but this known method involves a procedure such that a plan view, both side views and the like are drawn once by a computer, these drawings are stored in a memory, the stored plan view and both side views and the like are called to be displayed, e.g., on the screen of a displaying apparatus, the projection angle is specified as is the position where the cubic view is draw, the shape or patter thereof is specified, and a projection drawing of the specified shape or pattern is displayed at that specified position. Accordingly, it is required to draw and store the plan view and the side views without fail utilizing the computer before drawing the cubic view, and therefore this method has disadvantages of complicated work contents and a very long working time.

SUMMARY OF THE INVENTION

It is a principal object of the present invention to provide a method of drawing a cubic view wherein a cubic view can be drawn simply in a short time without performing troublesome calculations.

In order to achieve such a purpose, in a preferred embodiment of the method of the present invention, standard patterns that comprise specific shapes making a number of different inclination angles with a plane of projection are projected on a plane of projection and are stored in a memory. Subsequently, at least one standard pattern is called to be displayed at an arbitrary position on the screen of the displaying apparatus. Then, among the standard patterns called on the above-mentioned screen, a required standard pattern is directed by a directing means, being copied to be displayed at a predetermined position.

Such a copied standard pattern does not have a desired magnitude as yet and, that standard pattern is magnified or reduced at that position by multiplying the copied pattern by a ratio of the required dimension to be displayed to the standard dimension. Actually, the cubic view is composed of combinations of a number of lines and ellipses, and therefore only lines and ellipses have to be considered as the above-mentioned specific patterns. Then, a predetermined shape is drawn as a cubic view by repeating the above-mentioned sequential drawing of lines and ellipses.

Straight lines to be stored as the above-mentioned standard patterns are straight lines which are obtained by projecting straight lines having predetermined standard dimensions and making a number of different inclination angles with a plane of projection onto that plane of projection, and it is very effective, according to this invention, to use straight lines having reducing ratios responding to the inclination angles to the above mentioned standard dimension.

Also, for ellipses to be stored as the above-mentioned standard patterns, it is effective to use the ellipses obtained by projecting ellipses having standard diameters and making a number of different inclination angles with a plane of projection onto that plane of projection.

Also, if this ellipse is composed of two semi-ellipses which can be separated in a symmetric fashion along the major axis, the labor for erasing parts of ellipses can be effectively reduced.

Generally, a cubic view is drawn by isometric projection and, accordingly, it is also effective to form the above-mentioned patterns by using ellipses or straight lines which are drawn by an isometric illustration.

In accordance with the present invention, in the actual drawing, a cubic view can be drawn by utilizing the lengths and the angles appearing in the plan view intact and with similar data from the side views which are expressed bidimensionally, so that the drawing work is extremely simple and the working time can be reduced remarkably in comparison with conventional methods.

BRIEF DESCRIPTION OF THE DRAWINGS

FIG. 1(a) through FIG. 1(H0 are process drawings illustrating the drawing of a cubic view of a pipe joint as shown in FIG. 3 in a sequence of stages.

FIGS. 5(a)–5(c) are pattern views of ellipses to be stored in the preparatory stage.

FIGS. 11(a)–11(c) depict stages in a procedure in the development of a cubic view using straight line segments.

DETAILED DESCRIPTION OF THE INVENTION

Figure 12:
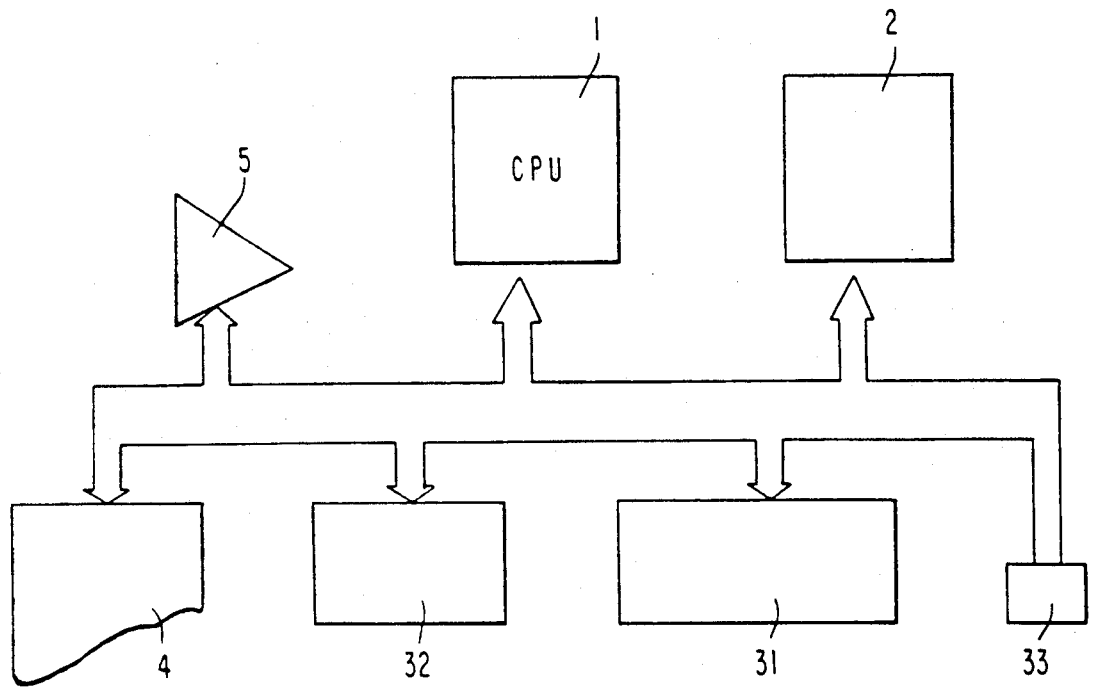
FIG. 12 is a schematic illustration of a typical CAD apparatus including a conventional computer display screen, a keyboard and a mouse.
Figure 13A:
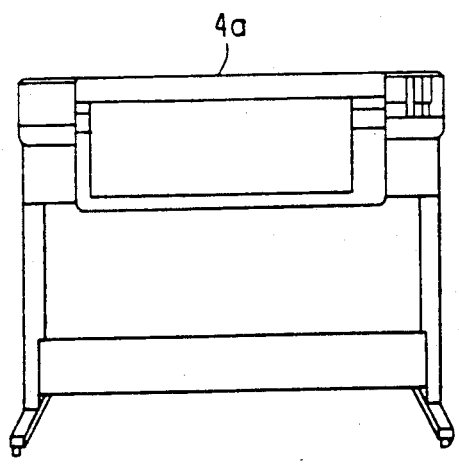
FIGS. 13(a) and 13(b) are perspective views of the CAD apparatus.
Figure 13B:
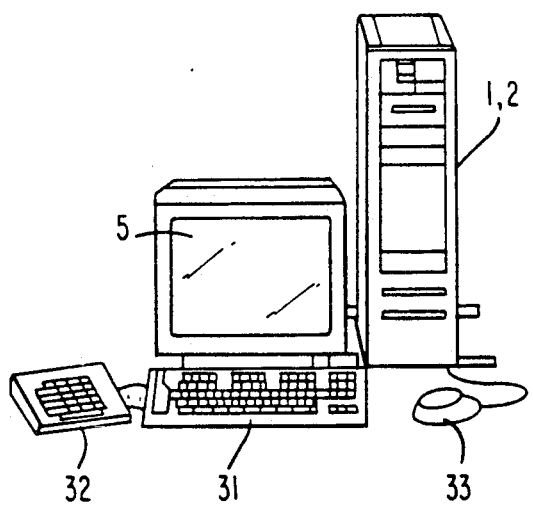

The method according to the present invention can be practiced with basically a conventional computer and a known CAD system. The essential elements of hardware, as best seen in FIGS. 12 and 13(a)-13(b), comprise a CPU 1, a memory 2, a keyboard 3, a plotter or a printer 4, and a display 5. Although the keyboard 3 may be designated in a CAD system by utilizing that of the conventional computer as it is, there may be provided a keyboard 31 of the conventional computer and, optionally, a keyboard 32 adapted exclusively for a CAD system and a mouse 33 in order to simplify the operational steps of the CAD system.

According to the typical CAD system, if it is of course possible to draw straight lines of predetermined length in a predetermined direction or a circle of predetermined diameter (including an ellipse) as its own inbuilt function.

An exemplary apparatus for practicing the method of the present invention employs an IBM system PC/AT or PS/2 as a conventional computer, but of course other conventional computers may be used in combination with the CAD.

It is now described how one may use the IBM system PC/AT or PS/2 as the conventional computer shown in FIGS. 13(a)-13(b), with a MICRO CADAM of Cadam Corporation (a joint company of IBM and Lockheed) as a CAD system.

Figure 14:
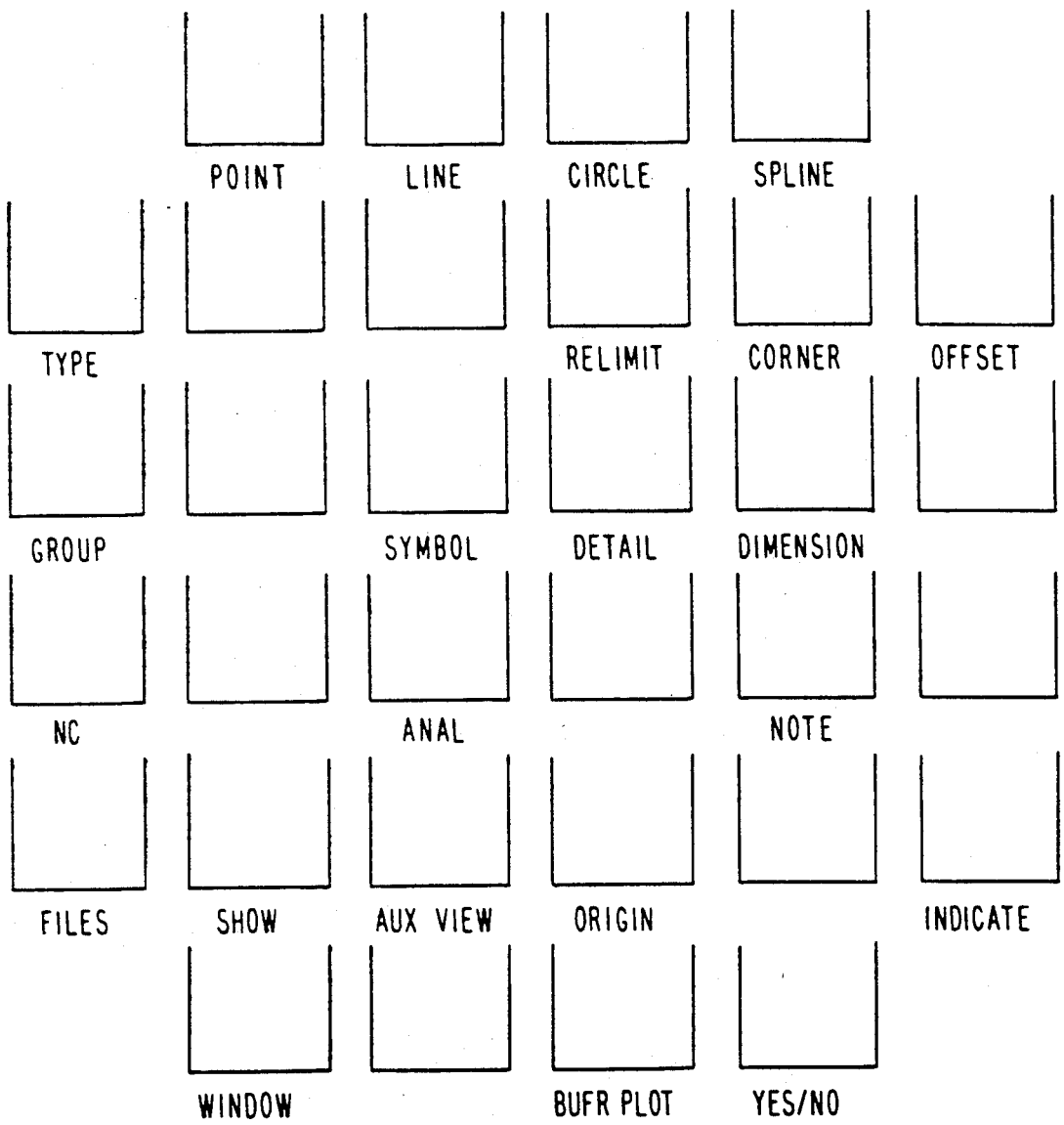
FIG. 14 is a plan view of an exemplary keyboard of the type used in the CAD apparatus.

The program of the MICRO CADAM is registered in the memory 2 together with the basic program of the system PC/AT or PS/2. Further, FIG. 14 shows plan view of the keyboard 32 adapted exclusively for the MICRO CADAM.

The following is a description of the function and operation of apparatus for practicing the method of the present invention.

Mode I: Straight Lines

When a straight line is drawn with such a CAd, the user first touches a Line Key of the keyboard 32 of the CADAM, and designates an original point on the display 5, and then designates a direction (this direction is designated to be a clockwise direction or a counter-clockwise direction with respect to a horizontal axis or the designated straight line, by using a cursor which is moved by means of the mouse 33), an angle (for instance to a horizontal) and a length with a corresponding numerical value selected by means of the keyboard 31 of the computer.

Mode II: Ellipses

When ellipses are desired to be drawn, the following steps are taken.

When an operator touches a Circle Key of a keyboard 32, the CPU 1 shows the words "a circle" and "an ellipse" on a display 5, so that either "a circle" or "an ellipse" may be chosen. The user then moves a cursor to the word "an ellipse" by using the mouse 33 so as to designate the "an ellipse", and then inputs the length of the apse line, the length of the major axis, the direction and an angle (for instance to a horizontal) of the minor axis, so that a predetermined ellipse may be drawn.

Mode III: Copy

The designated forms or patterns, such as the straight lines and the ellipses drawn on the display 5 in accordance with the above-mentioned manner, may be copied at a desired position.

First, touch a Group Key of the keyboard 32 of the CADAM. At the same time, the word "copy" is displayed together with display of other functions, and therefore the "copy" is designated by means of the mouse 33.

Next, designate the straight line or the ellipse to be copies by using the mouse 33, and further designate the original point of copy of the straight line or the ellipse. Then, further designate the original point where a copy takes place, so that it is copied to accord the above original point to the original point where a copy takes place. In case, the word "nocopy" is chosen instead of the "copy", the original straight line or ellipse is not retained for use.

The above-mentioned copy function may be adapted for not only the above-mentioned straight line or ellipse, but also for a pattern combining the necessary straight lines and ellipses. Namely, in accordance with the above-mentioned manner, designate all of the straight lines and ellipses used for the pattern and the further designate the original point of copy and the original point where a copy takes place.

Mode IV: Enlargement and Contraction

The designated forms or patterns such as the straight lines and the ellipses drawn on the display 5, in accordance with the above-mentioned manner, may be enlarged or reduced with a desired magnification.

First, push a Group Key of the keyboard 32 of the CADAM. At the same time, the term "SCL" is displayed together with display of other functions, and therefore the "SCL" is designated by means of the mouse 33.

Next, designate the straight line or the ellipse to be enlarged (contract), by using the mouse 33 and further designate the original point of enlargement (contraction) of the straight line or the ellipse so that it is enlarged (or contracted) with the original point as a starting point. (For instance, where a center of the ellipse is regarded as an original point, it may be enlarged coaxially or the original ellipse. Where an end of the straight line is an original point, the other end of the straight lie may be caused to move from the original point as a starting point in accordance with a predetermined magnification). This enlargement (contraction) function may be adapted for not only the above-mentioned straight line or the ellipse, but also for a pattern combining necessary straight lines and ellipses.

On the other hand, a drawing which is frequently used by a user, such as a drawing of a screw having a particular shape, may be registered as a Detail and the registered Detail may be read out on a drawing by touching a Detail key when necessary, and a drawing thereof may be printed out by means of a plotter or a printer. Further, it is so arranged that the drawing may be enlarged or contracted (for instance, including enlargement only in its longitudinal directions), or revised in its shape or otherwise when it is output to the plotter or printer.

The above-mentioned function and other basic functions necessary to practice the present invention are those which are originally provided with the basic program of, for example, the IBM system PC/AT or PS/2. A program, e.g., the MICRO CADAM by CASDAM Corp. (a joint company of IBM and Lockheed), and the method steps per the present invention are practiced by utilizing such basic programs and their associated hardware. The actual listing of such programs is typically locked so as not to be open to users.

Figure 4A:
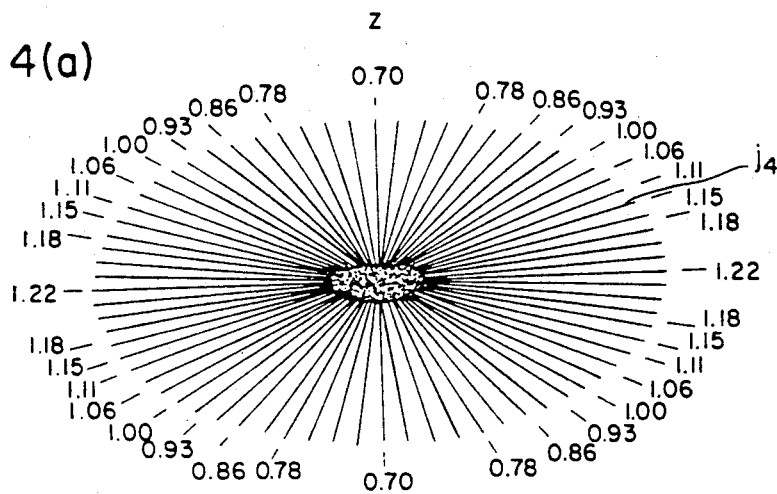
FIGS. 4(a)–4(c) are pattern views of straight lines to be stored in the preparatory stage.
Figure 4B:
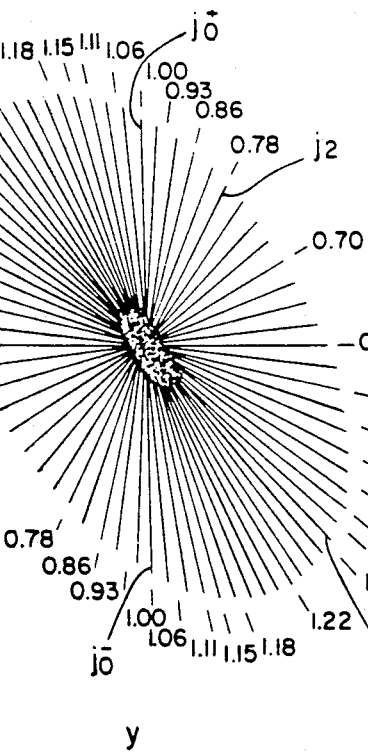
Figure 4C:
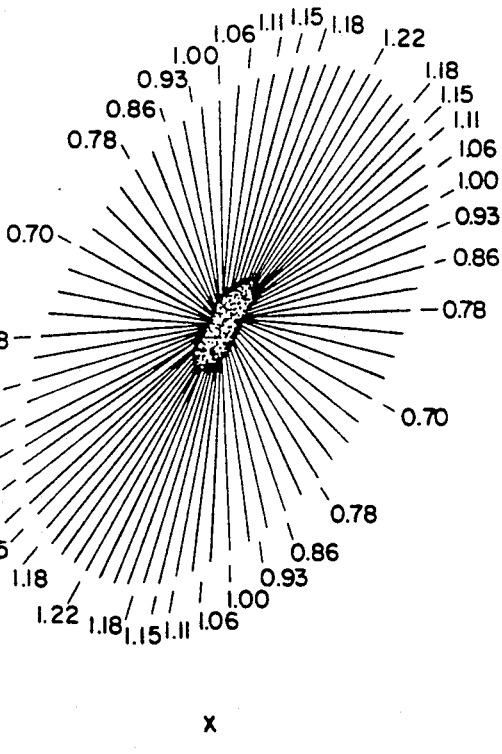
Figure 6A:
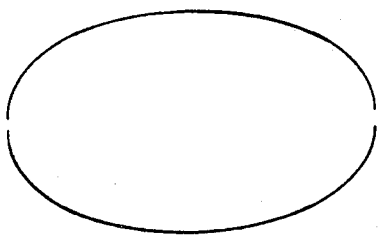
FIGS. 6(a)–6(d) are pattern views of standard elliptic patterns to be stored in the preparatory stage.
Figure 6B:
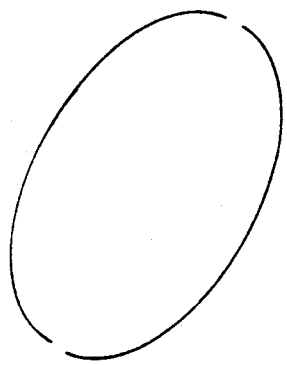
Figure 6C:
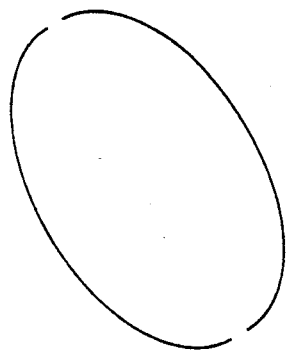
Figure 6D:
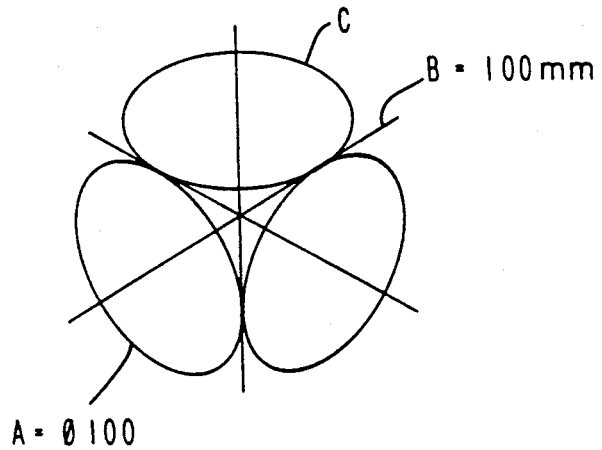

The most important point of the present invention lies in that the basic drawings, i.e. the standard lines shown in FIGS. 4(a)-4(c) the standard ellipse shown in FIGS. 5(a)-5(c) an a combination of the standard ellipse in an angle of 35° 16' and the standard lines shown in FIG. 6(d), may be registered as Detail in Detail area and that such basic drawings may be read out and used when necessary. In other words, scales of ellipses used for cubic drawings and scales of straight lines having predetermined orientations are memorized in the memory and, further, it is possible to enlarge and adjust the sizes of such scales of ellipses or the lengths of such scales of straight lines.

FIG. 1(a) of the present invention shows a state in which the basic pattern registered as a Detail is read out. To move to the states of FIG. 1(b) from that of FIG. 19a), the copying function and enlargement and contract functions are used by operating the mouse 33 from indications showing various functions, as indicated at lower portions of the drawing by pushing a "GROUP KEY". Such functions typically are originally provided with the MICRO CADAM. Further, copying of the straight lines and contraction thereof shown in FIG. 1(d) is done in the same manner as the copying of the ellipse and any contraction thereof.

The present invention is applicable to either isometric illustration or diametric illustration. Typically, handling manuals of commodity and the like are drawn in isometric illustration in almost all cases, and therefore a detailed description is provided of an exemplary case where the present invention is applied to such an isometric illustration. The exemplary isometric illustration is a projection drawing onto the horizontal plane in a case where an object to be drawn is inclined with respect to the horizontal plane by 35° 16'.

Initially, the case of drawing a cube is considered. First, as shown in FIG. 11(a), the cube is placed on a horizontal plane H so that two vertical planes of this side make an equal angle (45°) from a horizontal line h, and the state wherein this cube is raised by 35° 16' in a direction V orthogonal to the horizontal line (FIG. 11(b)) is projected onto the horizontal plane. In this case, a top plane Z and two vertical planes of this side X and Y (hereinafter these three planes are referred to as standard planes) are drawn, for example, as three domains x, y and z (hereinafter these three planes are referred to as standard planes of projection) which are bounded by three lines $v$, $\delta$ and $\sigma$ are lines of projection of ridge lines $\Gamma$, $\Delta$ and which make boundaries of the above-mentioned three planes.

Next, a detailed description is provided of an embodiment wherein the present invention is applied to the above-mentioned isometric illustration based on the plane drawings.

At a preparatory stage, the standard patterns are stored in a memory of a computer 1, which is illustrated schematically in FIGS. 12 and 13(a)-13(b). These standard patterns include straight lines and ellipses which are formed as described below. As shown in FIG. 4, the straight lines are formed by projecting straight lines of all directions having a predetermined standard dimension, for example 10 mm which are drawn on the above-mentioned three standard planes X, Y and Z onto the plane of projection, and as shown in FIGS. 4(a)-4(c), these straight lines are drawn on the standard planes of projection x, y and z with the lengths having reducing ratios for responding to the inclination angles to the above-mentioned standard dimension. This reducing ratio is as shown at the an of each line in FIGS. 4(a)-4(c). In this case the lengths of the lines parallel to the standard lines of projection $\tau$, $\delta$ and $\sigma$ (shown by thick full lines in FIGS. 4(a)-4(c)) are taken as the standard length (100 mm) (in FIGS. 4(a)-4(c), the ratio of length of each line with 100 mm taken as unity is indicated). In FIGS. 4(a)-4(c), each line segment expresses the state wherein each line, drawn on each standard plan X, Y and Z at intervals of 5°, is projected onto the standard planes of projection X, Y and Z, and the angular interval can be memorized in units smaller or larger than 5°. Also a point where each line intersects is set as an origin, and accordingly negative and positive signs can be used distinctively even in the same direction.

Of course, each of the straight lines as mentioned above may be made by using Mode I and Mode IV.

Next, as shown in FIG. 5, the ellipses are formed by projecting circles having a predetermined standard diameter, for example 100 mm, which are drawn on planes of all directions orthogonal to the above-mentioned standard planes X, Y and Z onto the plane of projection, being equivalent to elliptic rules used for normal cubic drawing. In FIGS. 5(a)-5(c), each straight line is taken from each straight line in FIGS. 4(a)-4(c), and the length thereof has no meaning in this case. Also, the angle marked at each end of line corresponds to the angle of the elliptic rule used in the case of drawing a cubic view by handwork.

Among the group of ellipses as shown in FIGS. 5(a)-5(c), the ellipses obtained by projecting circles drawn on planes orthogonal to the standard lines $\Gamma$, $\Delta$ and (correspond to the respective standard planes X, Y and Z) onto the plane of projection (hereinafter referred to as basic elliptic patterns) are particularly important. These are, therefore, illustrated in an extractive fashion in FIGS. 6(c)-6(d). This means that FIG. 6(a) shows an ellipse formed by projecting a circle drawn on the standard plan Z, FIG. 6(b) shows a ellipse formed by projecting a circle drawn on the standard plane X, and FIG. 6(c) shows an ellipse formed by projecting a circle drawn on the standard plane Y. As is obvious from FIG. 1(a), and as described later, the length in the directions of the standard lines of projection $\tau$, $\delta$ and $\sigma$ is taken as the length of the standard diameter (100 mm in this case). As shown in FIGS. 6(a)-6(d), each of these ellipses is composed of two semi-ellipses which are symmetric with respect to the major axis and, in the process of drawing a cubic view as described below, a semi-ellipse tube can be used as required, or a complete ellipse can be used.

Each of the ellipses as mentioned above may be made by using Mode II and Mode IV or an elimination mode of the CADAM.

Required patterns are a group of straight lines and a group of ellipses as mentioned above. Among these, combined basic patterns, as shown in FIG. 6(d), wherein straight lines parallel to the above-mentioned standard lines of projection $\tau$, $\delta$ and $\sigma$ (hereinafter referred to as basic straight line patterns) are combined with the above-mentioned basic elliptic patterns are frequently employed, and therefore may be stored specially.

Figure 2:
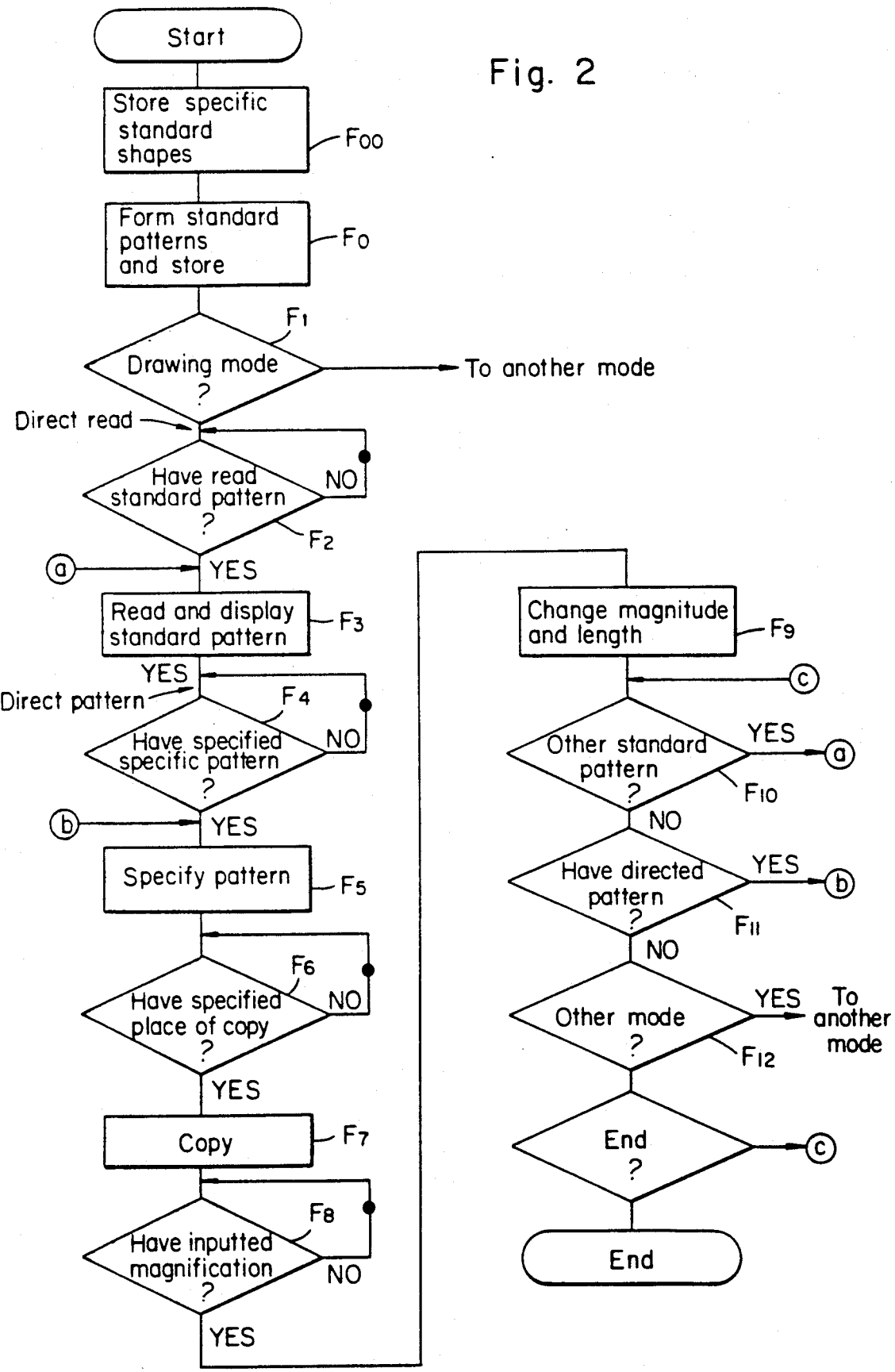
FIG. 2 is a flow-chart showing a flow of procedures of the calling stage and the following stages of a method of drawing a cubic view in accordance with the present invention.
Figure 3A:
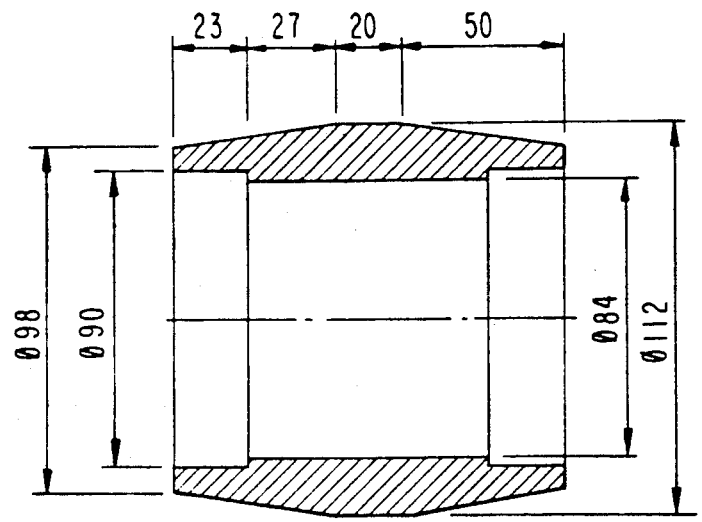
FIG. 3(a) is a longitudinal cross-sectional side view of the pipe joint to be shown by a cubic view.
Figure 3B:
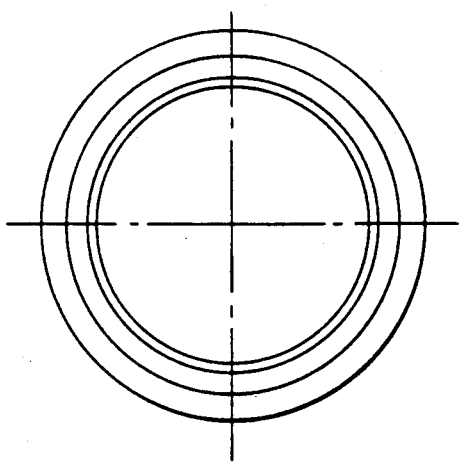
FIG. 3(b) is a side view of the above-mentioned pipe joint.

Next, a description is provided of a procedure for drawing a cubic view of a pipe joint, as shown in FIG. 3(a) and (b), based on the standard pattern thus stored and formed at steps $F_0$ and $F_{00}$ according to a flow chart as shown in FIG. 2. In addition, FIG. 3(a) is a cross-sectional view, and FIG. 3(b) is a side view of the pipe joint.

First the drawing mode is set by operating a keyboard switch of a computer (F1), a call for a desired standard pattern is directed (in FIGS. 1(a)-1(h), the above-mentioned combined basic patterns are called), and that standard pattern is displayed at an arbitrary position (position where drawing of the cubic view is to be made hereafter is not obstructed) 20 on the screen of a displaying apparatus (F2 and F3). See also FIGS. 12 and 13(a)-13(c) illustrating schematically essential elements of such a known apparatus.

Next, out of the combined standard patterns called on the computer screen 5, the operator specifies a basic elliptic pattern A on the standard plan of projection y by a known directing tool such as a mouse 33, a keyboard switch 31, light pen or the like as illustrated, for example, in FIGS. 13(a)-13(c) and thereby the computer recognizes which basic pattern has been designated (F4 and F5). Furthermore, the position where a projection drawing of an inner peripheral circle at one end of the pipe joint is entered (position of center ellipse), is designated by the above-mentioned directing tool (F6), and thereby the basic elliptic pattern A is copied at that position (F7). As is clear from the description of the above-mentioned Mode III, there is also provided step between steps 6 and 7, which step designates the original point of copy of the standard elliptic pattern, but such a step is omitted from the drawings for simplicity. Here, the operator specifies a required dimension (here 90 mm) and the ratio (0.90) to the standard dimension (100 mm) for the copied basic elliptic pattern A, and thereby the basic elliptic pattern A is displayed at that position in a reduced fashion according to that reducing ratio (F8 and F9). This ratio is inputted by operating the keyboard switch 31.

Next, a projection drawing of an outer peripheral circle of one end of the pipe joint is entered and displayed according to a similar procedure (F11, F5 through F9). This means that the basic elliptic pattern A is directed by the directing tool. A pattern to be copied is thereby directed (F11 and F5), and the position where a projection drawing of the outer peripheral circle at one end of the pipe joint is entered is also directed by the above-mentioned directing tool, and the basic elliptic pattern A is copied at that position (F6 and F7). Thereafter, the copied basic elliptic pattern A is multiplied by a required ratio (0.98), and that basic elliptic pattern A is displaced in a reduced fashion at that position (F8 and F9).

Thus, a projection drawing of the inner peripheral circle and the outer peripheral circle at one end of the pipe joint is drawn as shown in FIG. 1(c).

Furthermore, in order to obtain the position of one end face of a terrace part formed inside the pipe joint, a basic straight pattern B is directed by the directing tool (F11 and F5), the starting end position there is directed by the directing tool (F6), the basic straight line pattern B is copied at that position (F7), thereafter being multiplied by a ratio (0.23), and as shown in FIG. 1(d) and (e), the center line from one end of the pipe joint to one end of the terrace part is displayed (F9). Then, as shown in FIGS. 1(e) and (f) in sequence, an outer peripheral circle and an inner peripheral circle of the terrace part are entered with the other end of this center line centered according to a procedure like the one mentioned above.

A profile of circle portion is formed by repeating such a procedure, and thereafter, as shown in FIG. 1(g), a profile straight line C connecting each circle of the outer peripheral surface is also entered, e.g., by utilizing the line drawing entering function that the normal computer has and, by utilizing the line drawing/erasing function that a normal computer has, the hidden lines and the center line are erased and thereby the cubic view of the above-mentioned pipe joint is completed as shown in FIG. 1(h).

Furthermore, as required, each kind of line showing the profile of the pipe joint is thus drawn, e.g., thick full lines, dashed lines, chain lines and the like, as are specified by operating the keyboard switch. By utilizing the line kind selecting function typically available in a normal computer, the projection drawing of the inner peripheral circle at one end of the pipe joint is displayed by lines of the specified kinds (F12). In addition, other modes on flow chart in FIG. 2 include the mode for selecting the kind of line, the hidden line erasing mode and the like.

In addition, in the case where a standard patter other than the standard pattern read in steps F2 and F3 is required during operation, or in the case where the above-mentioned line putting work, erasure of hidden lines or work of selecting the kind of line is required to be made, processing can shift any time to a state wherein the above-mentioned work ca be performed in steps F10 and F12 or in the portion marked with in the flow chart.

Also, in the process of drawing, there may also arise a case where the whole ellipse does not have to be used, i.e., a case where a semi-ellipse suffices. In this case, it is preferable to use a semi-circle, to avoid having to erase work, as shown in FIG. 1(h). Also, in the above-mentioned case, the reducing ratio (magnifying ratio) to the actual size is multiplied, but needless to say, it is also possible to draw a small (large) cubic view by employing another reducing ratio (magnifying ratio) so that this reducing ratio (magnifying ratio) is multiplied further by a constant ratio.

As is mentioned above, a circle is copied by directing the basic elliptic pattern thereof and the center position and is displayed in a magnified or reduced fashion by multiplying a required magnifying or reducing ratio, and a straight line pattern thereof and the starting point thereof and is displayed in a magnified or reduced fashion by multiplying a required magnifying or reducing ratio, and the kind of line is changed or part of line is erased by utilizing the functions given to the normal computer as required, and thereby a cubic view an be completed.

Figure 7A:
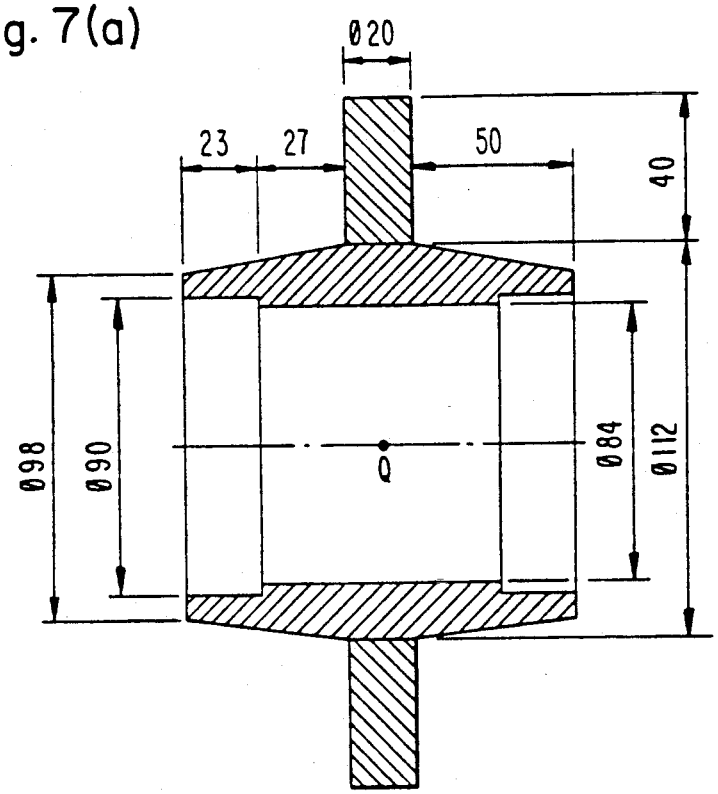
FIG. 7(a), is a cross-sectional view of an object in which protrusions are added to the pipe joint as shown in FIGS. 3(a) and 3(b).
Figure 7B:
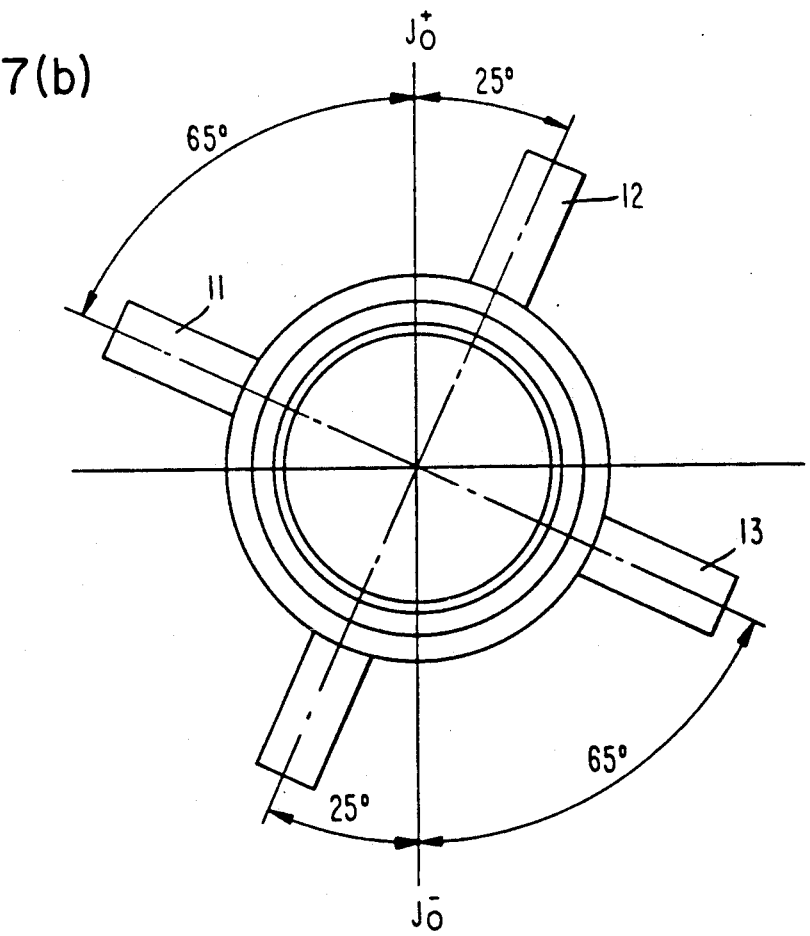
FIG. 7(b) is a side view of the object.
Figure 7C:
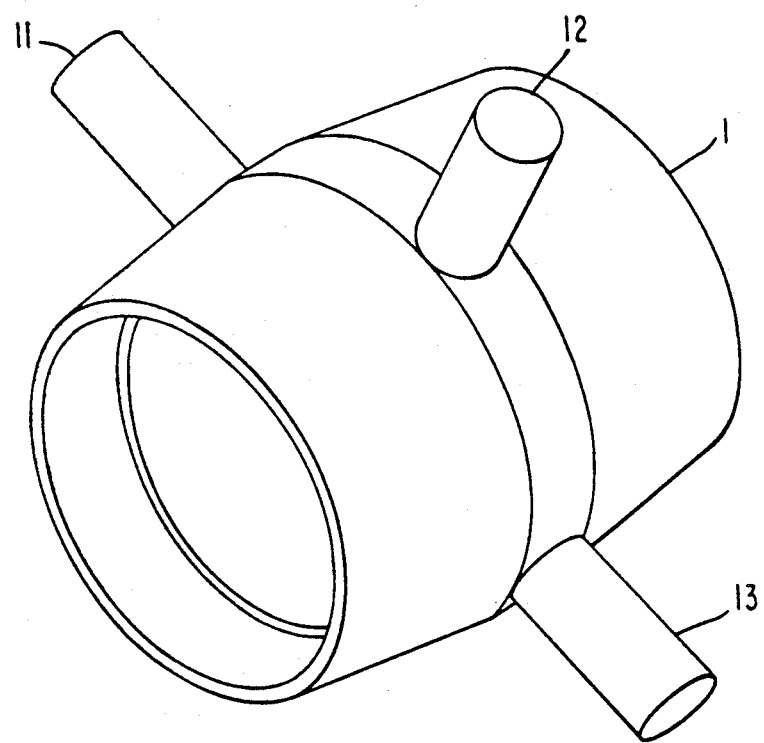
FIG. 7(c) is a cubic view which is drawn employing the present invention.
Figure 8A:
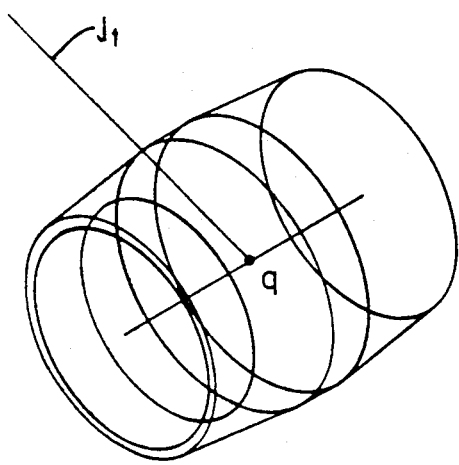
FIGS. 8(a)–8(d) depict successive stages in the development of a cubic view using ellipses.
Figure 8B:
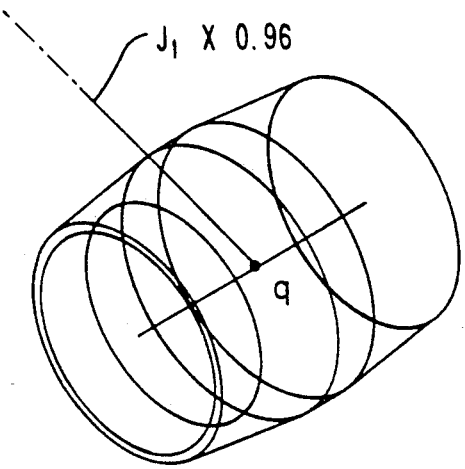
Figure 8D:
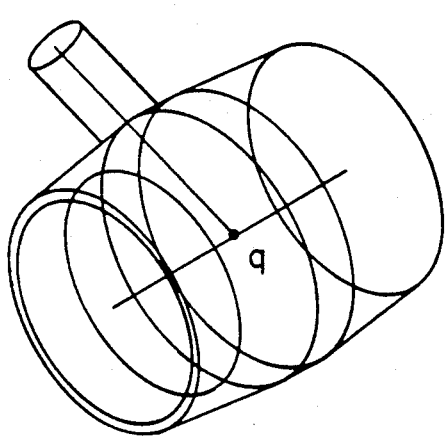
Figure 8C:
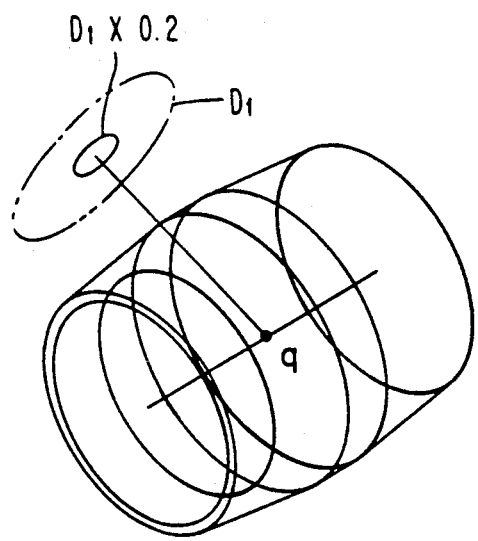

In the above-mentioned embodiment, the cubic view is drawn only by employing the basic elliptic pattern and the basic straight line pattern drawn on the standard plane of projection. However, in a case of drawing an object of a shape such that, for example, protrusions are installed on a pipe joint 1 as shown in FIG. 7(c) of which a cross-section is shown in FIG. 7(a) and whose side view is shown in FIG. 7(b), other kinds of standard patterns are further required. This means that, in this example, a protrusion 11 protrudes in the direction 65° from a perpendicular JO, and therefore a straight line of that direction, that is, a straight line J1 on the plane Y in FIGS. 4(a)-4(c) is selected, and this straight line is copied so that the center of the pipe (a point q in FIG. 8 corresponding to a point Q in FIG. 7(a)) will become the starting point thereof as shown in FIG. 8(a). Subsequently, as shown in FIG. 8(b), the length of the straight line $J_1$ is converted into the length on the cubic view in such a manner that the straight line $J_1$ is multiplied by a magnification (0.96) equivalent to the ratio of the length between the above-mentioned center and the end face of the protrusion in the case where a larger or smaller display is intended, another ratio is required to be selected as mentioned above. Then, as shown in FIG. 8(c), an ellipse $D_1$ selected from FIGS. 5(a)-5(c) is copied with the top of this straight line $J_1$ centered, and is multiplied by a predetermined ratio (0.2), this being adjusted to a required magnitude, and thereafter a profile line is entered as shown in FIG. 8(d). Also, a protrusion 12 protrudes in the direction of 25° from the perpendicular $J_o$ in the plan view, and therefore the cubic view is drawn by employing a straight line $J_2$ in that direction and ellipse D2 in the direction orthogonal to that direction as shown in FIGS. 5(a)-5(c). Furthermore, a protrusion 13 protrudes in the direction of 65° from the perpendicular $J_o$ on the plan view, and therefore a straight line $J_3$ in that direction and an ellipse $D_3$ in the direction orthogonal to that direction are sued. In addition, the processes up to FIG. 8(a) are the same as the processes from FIG. 1(a) through FIG. 1(g).

Figure 9A:
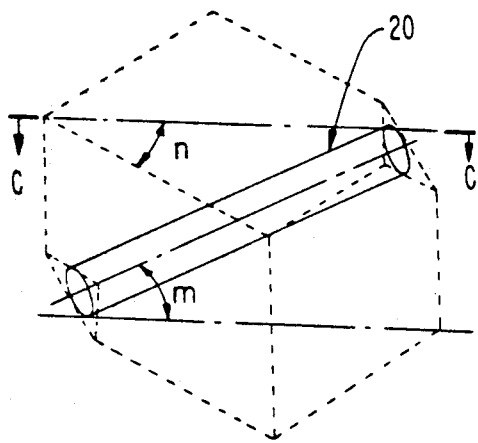
FIGS. 9(a)–9(d) depict stages in the development of a drawing for which cubic views cannot usefully be shown.
Figure 9B:
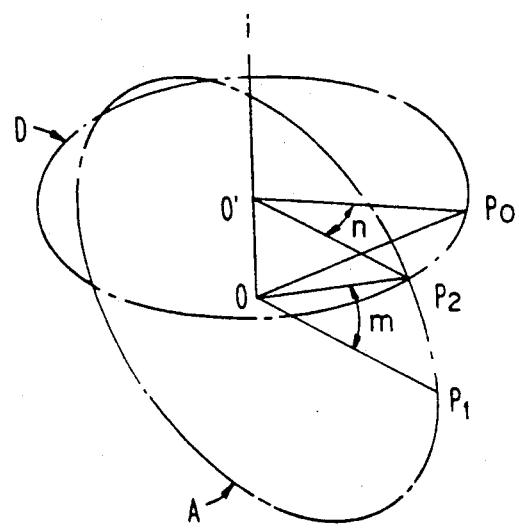
Figure 9C:
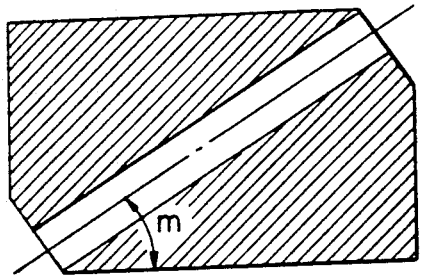
Figure 9D:
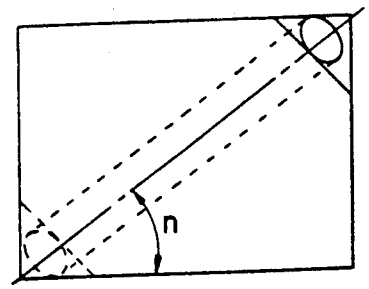

A description is provided now for making a drawing where no cubic view can be drawn, simply only by employing the standard (basic) patterns as shown in FIGS. 4(a)-4(c) and FIGS. 5(a)-5(c). Full lines in FIG. 9(a) show a cylindrical body 20 disposed along a diagonal line of a rectangular prism, and this cylindrical body 20 has an inclination of m° to the horizontal plane, and has an inclination of n° when viewed from the plan view. Determination of the ellipse drawn at the end face of this cylindrical body 20 is made according to the following procedure. This means, that, as shown in FIG. 9(b), first, a standard straight line patter O-$P_1$ (a line parallel to the standard line of projection δ) of the basic elliptic pattern A (projection figure of the circle having the standard diameter drawn on the standard plane Y) selected in the above-mentioned FIG. 6(d) is rotated by m° to obtain a line segment O-$P_2$. Subsequently, an intersection point with a perpendicular to the center line (a line parallel to the standard line of projection) from a point $P_2$ is taken as O'. With this point O' centered, the ellipse D intersecting the ellipse A at the point $P_2$ is drawn by multiplying the basic elliptic pattern C (a projection figure of a circle having a standard diameter drawn on the standard plan Z) by an appropriate magnification, and line segment O'-$P_o$ is further rotated by n° along the ellipse D to obtain a line segment O-$P_o$. Then the length of a line segment O-$P_o$ formed by this point Po is measured using the measuring function that the computer has originally, and a direction having a line segment (for example a line segment $J_4$ on the standard plane of projection z) of a length equal (or nearly approximate) to this line segment O-$P_o$ is selected from FIGS. 4(a)-4(c). An ellipse corresponding to the direction thus determined (for example, an ellipse D4 on the standard plane of projection z in FIG. 5(a) is the standard pattern to be selected in the above-mentioned step F4.)

Figure 10A:
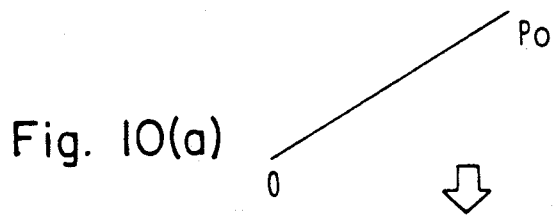
FIGS. 10(a)–10(e) depict stages in a procedure for drawing a cylindrical body using selected ellipses.
Figure 10B:
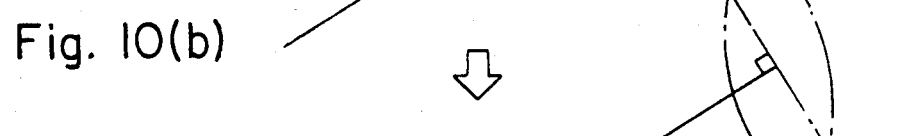
Figure 10C:
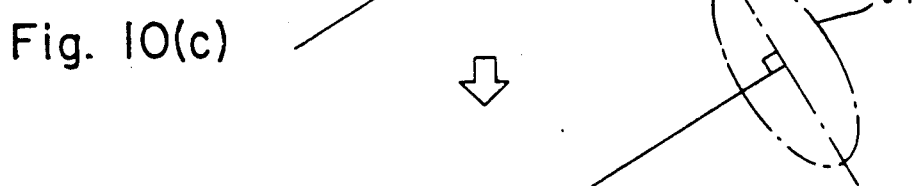
Figure 10D:
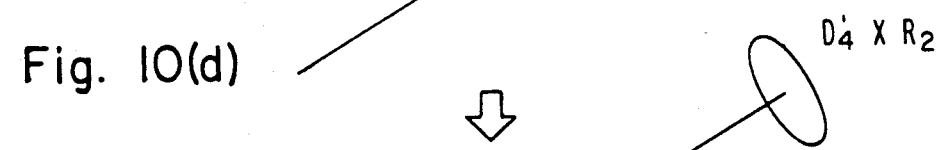
Figure 10E:
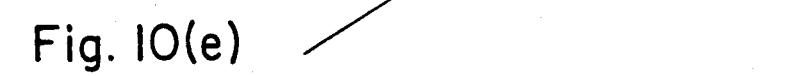

Next, a description is provided of a procedure for actually drawing the cylindrical body 20 using the ellipses thus selected. First, as shown in FIG. 10(b), a straight line of the length of the cylindrical body 20 is obtained in a manner such that the above-mentioned straight line O-$P_o$ is multiplied by a constant ratio R1. Subsequently, as shown in FIG. 10(d), the ellipse D4 previously selected is copied at the top of this straight line, and an ellipse D4' is obtained by rotating the direction so that the direction of the major diameter of this ellipse will be orthogonal to the direction of the straight line, and further, as shown in FIG. 10(e), an ellipse of a required magnitude is obtained by multiplying the ellipse D4' by the ration R2.

An ellipse at another end of the cylindrical body 20 can be drawn likewise, and further the line-putting work ca be performed by the method as described previously.

In addition, the above mentioned rotating operation can be performed by utilizing the function that the computer has originally.

Furthermore, basically also in the diametric projection a cubic view is drawn by combining ellipses with straight lines. Accordingly, the method of drawing a cubic in accordance with the present invention is applicable also to trimetric projection and is not limited to the isometric projection.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

I claim:

1. A method of drawing a cubic view using a known computer assisted design (CAD) system that includes cooperating elements for storing shape-related data, for manipulating stored data and for displaying and copying shapes selected by a user, comprising the steps of:

storing in a storage element a selection of specific standard shapes of predetermined dimensions and geometries, for manipulation to respective selected orientations and combinations thereof for display and subsequent storage;

forming standard patterns obtained by displaying and manipulating a selection of said specific standard shapes to selected different inclination angles with respect to a plane of projection and selection projection thereof onto said plane of projection, and storing the standard patterns in said storage element;

displaying at least one of said stored standard patterns at an arbitrary position on a screen of a displaying element;

manipulating a standard pattern selected from a plurality of said standard patterns displayed on said screen and copying said selected standard pattern at a predetermined position; and adjusting a size of said copied standard pattern, to selectively magnify or reduce the same at said predetermined position by multiplying the copied standard pattern by a ratio of a required dimension to a predetermined standard dimension for subsequent display, storage or copying thereof, wherein said standard shapes comprise ellipses, and said ellipses are each defined by a combination of two semi-ellipses which can be separated with respect to each other along a major axis of the corresponding ellipse.

2. A method of drawing a cubic view using a known computer assisted design (CAD) system that includes cooperating elements for storing shape-related data, for manipulating stored data and for displaying and copying shapes selected by a user, comprising the steps of:

storing in a storage element a selection of specific standard shapes of predetermined dimensions and geometries for manipulation to respective selected orientations and combinations thereof for display and subsequent storage;

forming standard patterns obtained by displaying and manipulating a selection of said specific standard shapes to selected different inclination angles with respect to a plane of projection and selective projection thereof onto said plane of projection and storing the standard patterns in said storage element;

displaying at least one of said stored standard patterns at an arbitrary position on a screen of a displaying element;

manipulating a standard pattern selected from said standard patterns displayed on said screen and copying said selected standard pattern at a predetermined position; and adjusting a size of said copied standard pattern, to selectively magnify or reduce the same at said predetermined position by multiplying the copied standard pattern by a ratio of a required dimension to a predetermined standard dimension for subsequent display, storage or copying thereof, wherein said standard patterns comprise ellipses and straight lines drawn in combination as an isometric illustration.

3. A method of drawing a cubic view using a known computer assisted design (CAD) system that includes cooperating elements for storing shape-related data, for manipulating stored data and for displaying and copying shapes selected by a user, comprising the steps of:

storing in a storage element a selection of specific standard shapes of predetermined dimensions and geometries for manipulation to respective selected orientations and combinations thereof for display and subsequent storage;

forming standard patterns obtained by displaying and manipulating a selection of said specific standard shapes to selected different inclination angles with respect to a plane of projection and selected projection thereof onto said plane of projection and storing the standard patterns in aid storage element;

displaying at least one of said stored standard patterns at an arbitrary position on a screen of a displaying element;

manipulating a standard pattern selected from said standard patterns displayed on said screen and copying said selected standard pattern at a predetermined position; and adjusting a size of said copied standard pattern, to selectively magnify or reduce the same at said predetermined position by multiplying the copied standard pattern by a ratio of a required dimension to the standard dimension for subsequent display, storage or copying thereof, wherein said standard patterns comprise ellipses and straight lines drawn in combination to form a diametric illustration.

4. A method of drawing a cubic view using a known computer assisted design (CAD) system that includes cooperating elements for storing shape-related data, for manipulating stored data and for displaying and copying shapes selected by a user, comprising the steps of:

storing in said storage element a selection of specific standard shapes of predetermined dimensions and geometries for manipulation to respective selected orientations and combinations thereof for display and subsequent storage;

forming standard patterns obtained by displaying and manipulating a selection of said specific standard shapes to selected different inclination angles with respect to a plane of projection and selective projection thereof onto said plane of projection and storing the standard patterns in said storage element;

displaying at least one of said stored standard patterns at an arbitrary position on a screen of a displaying element;

manipulating a standard pattern selected from said standard patterns displayed on said screen and copying said selected standard pattern at a predetermined position; and adjusting a size of said copied standard pattern, to selectively magnify or reduce the same at said predetermined position by multiplying the copied standard pattern by a ratio of a required dimension to the standard dimension for subsequent display, storage or copying thereof, wherein said standard shapes comprise straight lines and said standard patterns are obtained by projecting said straight lines each of a predetermined standard dimension at different inclination angles with respect to the plane of projection onto said plane of projection, said projected straight lines each having dimensions related to the corresponding inclination angles and the standard dimensions of the selected corresponding specific shapes, said standard shapes further comprise circles and said standard patterns further comprise ellipses obtained by projecting circles of selected standard diameters at different inclination angles with respect to the plane of projection onto said plane of projection, and said ellipses are each a combination of two semi-ellipses which can be separated along a major axis in a symmetrical fashion.

5. A method of drawing a cubic view, using a known computer assisted design (CAD) system that includes cooperating elements for storing shape-related data, for manipulating stored data and for displaying and copying shapes selected by a user, comprising the steps of:

storing in said storage element a selection of specific standard shapes of predetermined dimensions and geometries for manipulation to respective selected orientations and combinations thereof for display and subsequent storage;

forming standard patterns obtained by displaying and manipulating a selection of said specific standard shapes to selected different inclination angles with respect to a plane of projection and selective projection thereof onto said plane of projection and storing the standard patterns in said storage element;

displaying at least one of said stored standard patterns at an arbitrary position on a screen of a displaying element;

manipulating a standard pattern selected from said standard patterns displayed on said screen and copying said selected standard pattern at a predetermined position; and adjusting a size of said copied standard pattern, to selectively magnify or reduce the same at said predetermined position by multiplying the copied standard pattern by a ratio of a required dimension to the standard dimension for subsequent display, storage or copying thereof, wherein said standard shapes comprise straight lines and said standard patterns are obtained by projecting said straight lines each of a predetermined standard dimension at different inclination angles with respect to the plane of projection onto said plane of projection, said projected straight lines each having dimensions related to the corresponding inclination angles and the standard dimensions of the selected corresponding specific shapes, said standard shapes further comprise circles and said standard patterns further comprise ellipses obtained by projecting circles of selected standard diameters at different inclination angles with respect to the plane of projection onto said plane of projection, and said standard patterns comprise ellipses and straight lines drawn in combination to form an isometric illustration.

6. A method of drawing a cubic view, using ak known computer assisted design (CAD) system that includes cooperating elements for storing shape-related data, for manipulating stored data and for displaying and coping shapes selected by a user, comprising the steps of:

storing in said storage element a selection of specific standard shapes of predetermined dimensions and geometries for manipulation to respective selected orientations and combinations thereof for display and subsequent storage;

forming standard patterns obtained by displaying and manipulating a selection of said specific standard shapes to selected different inclination angles with respect to a plane of projection and selective projection thereof onto said plane of projection and storing the standard patterns in said storage element;

displaying at least one of said stored standard patterns at an arbitrary position on a screen of a displaying element;

manipulating a standard pattern selected from said standard patterns displayed on said screen and copying said selected standard pattern at a predetermined position; and adjusting a size of said copied standard pattern, to selectively magnify or reduce the same at said predetermined position by multiplying the copied standard pattern by a ratio of a required dimension to the standard dimension for subsequent display, storage or copying thereof, wherein said standard shapes comprise straight lines and said standard patterns are obtained by projecting said straight lines each of a predetermined standard dimension at different inclination angles with respect to the plane of projection onto said plane of projection, said projected straight lines each having dimensions related to the corresponding inclination angles and the standard dimensions of the selected corresponding specific shapes, said standard shapes further comprise circles and said standard patterns further comprise ellipses obtained by projecting circles of selected standard diameters at different inclination angles with respect to the plane of projection onto said plane of projection, and said standard patterns comprise ellipses and straight lines drawn in combination to form a diametric illustration.

* * * * *